United States Patent [19]

Leimbacher et al.

[11] Patent Number: 5,837,181
[45] Date of Patent: *Nov. 17, 1998

[54] THERMOPLASTICALLY FORMABLE COMPOSITE MATERIALS BASED ON POLYAMIDE 12 MATRIX

[75] Inventors: Roland Leimbacher, Domat/Ems; Eduard Schmid, Bonaduz, both of Switzerland

[73] Assignee: EMS-American Grilon Inc., Sumter, S.C.

[*] Notice: This patent issued on a continued prosecution application filed under 37 CFR 1.53(d), and is subject to the twenty year patent term provisions of 35 U.S.C. 154(a)(2).

[21] Appl. No.: 858,442

[22] Filed: May 19, 1997

Related U.S. Application Data

[63] Continuation of Ser. No. 530,896, Sep. 20, 1995, abandoned.

[30] Foreign Application Priority Data

Jul. 25, 1995 [DE] Germany ............ 195 27 154.8

[51] Int. Cl.$^6$ ...................... B32B 31/04
[52] U.S. Cl. .............. 264/258; 264/134; 264/137; 442/59; 442/165; 442/179; 442/180; 442/304; 442/327; 442/181
[58] Field of Search ............... 442/59, 181, 304, 442/327, 165, 179; 264/258, 134, 137

[56] References Cited

FOREIGN PATENT DOCUMENTS

| 0 134 992 | 3/1985 | European Pat. Off. . |
| 0 408 957 | 1/1991 | European Pat. Off. . |
| 0524509 | 1/1993 | European Pat. Off. . |
| 2064598 | 7/1972 | Germany . |

OTHER PUBLICATIONS

Japan Abstract, JP1145111, Jun. 7, 1989, Derwent Publication.
Japan Abstract, JP6080790, Mar. 22, 1994, Derwent Publication.
Japan Abstract, JP63005911, Jan. 11, 1988, Derwent Publication.
Japan Abstract, JP58152049, Sep. 9, 1983, Derwent Publication.
Japan Abstract, JP2053685, Feb. 22, 1990, Derwent Publication.

*Primary Examiner*—Helen L. Pezzuto
*Attorney, Agent, or Firm*—Browdy and Neimark

[57] ABSTRACT

The present invention relates to thermoplastically formable composite materials of reinforcing fibers in a polyamide 12 matrix, characterized in that the polyamide 12 matrix consists of anionically polymerized laurin-lactam maximally containing 15 weight-% of co-monomers and selectively additives which are determined on the basis of production, processing and use. The invention furthermore relates to a process for producing these composite materials, in accordance with which an activated anionic lactam 12 melt is prepared, which penetrates the fiber arrangement in the liquid state, so that it forms the matrix for a shaped body, the activated melt is final-polymerized under the effects of temperature and pressure in a mold or a tool in such a way that the shape is achieved, and the pre-formed part is subjected to an after-shaping step under the effects of pressure and temperature, if desired. The shaped bodies in accordance with the invention can be used for for producing protective channels, protective elements, support elements, load-bearing frame elements, cover elements, cage structures, structures for transmission systems, roofing of lightweight material, components of sporting goods, machine elements, components for ship and boat building, body and cover elements for vehicle construction, pipes for transporting media and protective conduits, particularly in the electrical field.

27 Claims, No Drawings

THERMOPLASTICALLY FORMABLE COMPOSITE MATERIALS BASED ON POLYAMIDE 12 MATRIX

This application is a continuation, of application Ser. No. 08/530,896, filed Sep. 20, 1995, now abandoned.

SPECIFICATION

The invention relates in particular to thermoplastically formable composite materials of reinforcing fibers in a polyamide 12 matrix and to a process for producing these composite materials or shaped parts.

Today, composite materials based on reinforcing fibers of the described type and a plastic matrix are essential elements in the construction of rail and road vehicles, in aircraft and ship construction, where weight savings are important, and in light construction for roofing, reinforcements of building structures and machine elemerits which are subjected to high acceleration forces, for example in weaving technology, or in sporting goods such as tennis racquets and golf clubs or aeroshafts.

In this case the basic principle is the impregnation of the filament structures, such as oriented rovings and woven fabrics, knitted fabrics, plaits and embroidered fabrics, with a highly flowable, in particular thermally activated melt of monomer and/or oligomer and/or prepolymer with subsequent shaping and curing underthe effects of heat and pressure.

Epoxy resins and curable polyester systems, for example, are customary in this case, wherein a thermoset plastic matrix is the resultant structure, i.e. the part cannot be reshaped.

If thermoplastic materials such as PEEK, polypropylene or polyamide are selected as the matrix of the filament structures, their wettability and impregnation is extraordinarily difficult because of a too high melt viscosity.

It is generally necessary to operate under high pressure and at high temperatures. In spite of this, the filaments in the interior of the fiber strands are often only incompletely or not at all wetted, and the removal of trapped gas is often hardly possible.

A search for thermoplastic materials which consist of a liquid prestage which can wet the fibers well, which then leads to matrix formation under the effect of heat in a short time therefore suggested itself.

It is then intended in a second process step to be able to bring this matrix into its final shape by heating it to a temperature above the melting point, wherein thermal welding with a component containing the same matrix should also be possible.

A process is described in U.S. Pat. No. 4,635,432, wherein a liquid polymer pre-stage wets, impregnates and encloses a preheated fiber rovings, for which a heated tool of a defined length is used.

Two components, polyurethane and the Nyrim PA-6 system containing polyester blocks, are recited as the prepolymer system.

This process is described in EP 0 384 063 A1 in respect to a pultrusion process, and an anionically- and cocatalytically activated lactam 6 melt of 80° C. has been described by way of example as polymer prestage. The temperature is raised to 150° to 170° C. during impregnation and shaping in the tool, so that the melt makes a direct transition into the solid polymer.

In its main employment, the resulting roving is comminuted into granules containing long fibers, which can subsequently be processed by means of injection molding.

A similar process, based on a lactam 6 system is described in EP 0 491 043 A1, wherein the impregnated roving is polymerized by means of an enveloping system made of fluoropolymer and is cured. Processing of the granules which are reinforced by long glass fibers is also performed by injection molding.

A special pultrusion process is described in EP 0 373 666 A2 which results in parts which can be reshaped, since thermoplastics are described as being the matrix.

To impregnate the fibers it is proposed to pull the roving through a fluidized bed of thermoplastic powder or through an aqueous suspension of the thermoplastic powder.

The process will probably prove to be extraordinarily expensive in actual use; it is known that thermoplastics can be grounded to a suitable grain size, which should not deviate too much from the diameter of the filaments, by only disproportionate efforts. With this process it is also difficult to achieve an impregnation with a constant weight proportion of matrix.

EP 0 281 447 A1 is also based on the "fluidized bed impregnation" of fiberglass rovings with polyamide powder, wherein a special heated die is used and a panel-shaped profile is the result.

EP 0 544 049 A1 describes a pultrusion process wherein activated lactam melt (PA 6) is used for impregnating the rovings and the temperature in the tool is raised at least into the melting range of the polyamide. This is intended to lead to improved properties and an improved surface of the pultrusion profile.

This advantage is at most relevant only if the temperature is not increased anyway past the matrix melting point in the post- treatment step. The process description is exclusively suited for polycaprolactam.

Pultruded profiles, parts and panels in accordance with the prior art described have so far hardly been accepted in practical use.

This may be the result of an insufficient suitability of the described matrix materials, such as residual monomer content, high water absorption, shrinkage, etc.

Polycaprolactam has a melting point of approximately 220° C., so that it is suitable for simple applications in which dimensional stability and shrinkage, for example, play a subordinate role.

Unfortunately, a large amount of residual monomer remains in the course of the anionic polymerization of caprolactam, particularly if processing takes place above the polymer melting point. The polymerization reaction also leads to great shrinkage. In addition, polyamide 6 absorbs large amounts of water in a moist environment, which can lead to dimensional changes, internal stresses, delamination and great changes in the matrix properties.

Composite materials of low specific weight, consisting of reinforcing fibers and a matrix which completely wets and encloses the fibers, are needed for a multitude of applications, which

* remain constant in their properties and dimensionally stable during changes in moisture,
* contain small proportions of extracts (residual monomers, oligomers), since too large residual monomer portions negatively affect the fiber adhesion as well as the toxicological or ecological environment,
* have great resistance to aqueous systems, grease, oil and fuels as well as alcohols,
* resist environmental effects extremely well, in particular outdoor weathering,

* and have sufficient thermal properties for a multitude of applications.

It is therefore the object of the instant invention to provide thermoplastically formable composite materials of reinforcing fibers in a polyamide 12 matrix which meet the above requirements and avoid the disadvantages of the prior art. A novel process is also to be provided which makes the production of these composite materials possible.

It has now been shown in an astonishing manner that the composite materials of filament arrangements of the type described and polyamide 12 as the matrix meet these requirements to a large degree if the matrix consists of anionically polymerized lactam 12 and the fiber impregnation takes place in the pre-polymer stage as long as the melt is low viscous and has a high degree of flow and wetting ability.

Thus, articles of use made of oriented fiber arrangements, in particular continuous fibers (filaments) and a matrix consisting preponderantly of polyamide 12 and which is produced in accordance with the process of anionic polymerization, are therefore the subject of the invention.

In this case the articles of use can be, for example, pultruded profiles, flat compressed parts or shaped bodies produced by resin transfer molding or in a process similar to roto-molding.

E-glass fibers, carbon fibers, fibers made from an aromatic polyamide, for example on the basis of p-phenylene diamine and isophthalic acid and/or terephthalic acid, or also fibers on the basis of renewable raw materials, such as hemp or flax and the like, are suitable as filaments.

In accordance with the invention, the volume proportion of the fibers is 25 to 60 vol.-% and in particular lies within the range of 45 to 55 vol.-%.

The fibers are provided with a structure depending on their predetermined application by means of a parallel placement process, or a weaving, knitting, plaiting, winding or an embroidery process or, depending on the spatial placement in the finished part, by means of a combination of these processes.

These processes are well known from the prior art and need not be discussed further.

What is novel and in accordance with the invention is that the matrix, which primarily consists of polylaurinlactam, completely wets the fibers as far as the interior of the fiber strand, which results in products with improved properties in comparison with the prior art.

This is achieved in that the matrix is produced in accordance with the process of anionic polymerization and the fiber structures are wetted in the low-viscosity pre-stage of polymerization. For this purpose, respectively an anhydrous catalyst-containing lactam 12 melt and an anhydrous activator- containing lactam 12 melt can for example be brought together with intensive intermixing and the mixture activated in this way can be used immediately in the still liquid state for impregnating and wetting the prepared continuous fiber structures.

However, it is also possible to proceed on the basis of anhydrous powder mixtures of lactam 12, catalyst and co-catalyst and to melt these under the effect of pressure and heat in the presence of the fiber structures, in which case penetration of the fiber structures by the melt takes place.

Final-polymerization of the activated lactam 12 melt under the effect of heat subsequently takes place, which generally is combined with a molding process.

Such final-polymerization processes, which are known to one skilled in the art, advantageously take place in a dry inert gas atmosphere.

In the pultrusion process, shaping takes place by means of a tool determining the finished shape, or by continuous hot-calendering of the impregnated flat fiber structures, such as woven fabrics, mats, layments, knitted fabrics and non-wovens, or with the aid of the known process of prepreg technology, which can also encompass degassing steps.

A further process is based on resin transfer molding (RTM) technology. In this case liquid activated lactam 12 melt is added to a specially structured reinforcing fiber structure contained in a hot mold in such a way that the prepared filaments are enclosed in the melt, and the melt is subsequently final-polymerized under the effect of temperature and pressure and the finished part is taken from the mold after it has cooled off.

In this connection pultrusion is a known process for producing continuous fiber-reinforced components, which today are almost exclusively produced by impregnation and curing of pressure-setting plastics.

The process is described, for example, in the ASM Handbook, volume 1, Composites, (1987), pp. 533 to 534.

Resin transfer molding (RTM) is an often used process, for example for producing fiberglass-reinforced body parts in the automotive industry. Thermoset plastics, such as unsaturated polyesters or epoxy resins are primarily used. The so-called structural resin injection molding (S-RIM) is a similar process. This process uses polyurethane reactive systems as the matrix. There exists a process for polyamides on a caprolactam basis modified from this, the so-called Nyrim process. NyRIM uses caprolactam as the main component.

The RTM process is described in the ASM Handbook, vol.1 (1987), Composites, pp. 564 to 568. The RIM and NyRIM processes are described in the Enc. of Polymer Science & Eng., 2nd ed. 1988, pp. 72 to 100.

The prepreg technique is today used to produce pre-impregnated semi-finished products, so-called prepregs, from fiber fabrics, mats, layments and knitted fabrics with pressure-setting and thermoplastic matrices.

These semi-finished products (prepregs) are subsequently processed into a fiber-reinforced article by means of known processes by those skilled in the art.

The production of prepregs is known. A multitude of products is commercially available. Processing of prepregs in connection with thermoplastic materials is described in the ASM Handbook, vol.1 (1987), Composites, pp. 544 to 553, and in connection with thermoset plastics in the ASM Handbook, vol.1 (1987), Composites, pp. 559 to 663.

To produce fiber-reinforced hollow bodies it is also possible to operate in accordance with a modified roto-molding process in such a way that the fiber arrangement, for example a knitted fiber fabric or knitwear or embroidered article, woven fabric or combinations must first be placed into the open mold. In the course of the process the liquid activated melt impregnates the fiber arrangement during rotation polymerizes and then changes into the solid matrix state during cooling.

Various options for executing the process in accordance with the invention are being offered.

For small series, dry powder mixtures of lactam 12, catalyst, such as sodium lactamate, and co-catalyst, such as acyl-lactam, can directly be produced, then brought into contact with the filament structures and melted under the effect of pressure and temperature whereby the filament structures are wetted and impregnated. The exclusion of moisture and operating in a protective gas atmosphere is essential.

A so-called two-pot process is particularly advantageous, wherein respectively equal proportions of catalyst-containing and activator-containing lactam 12 melt are intensively mixed shortly before impregnation, after which rapid polymerization, passing through a liquid, wetting-active state, starts.

Alternatively it is also possible to add a liquid co-catalyst, pre-thinned to a sufficient degree, to the catalyst-containing lactam 12 melt (single pot process), after which intensive mixing must be provided, for example by means of a static mixer. Alternatively for the static mixer, an intermeshing extruder, respectively kneader, can be used.

In the process the melt can also contain property-relevant substances to the extent that they do not essentially harm the course of polymerization. Stabilizers to protect against heat, light or hydrolytic decomposition, flame-retarding means or means for increasing toughness are possibilities.

A special activator system containing, for example polyether groups, can be used for increasing toughness.

Glass fibers, particularly made of E-, R-, S- and ECR-glass, carbon fibers of the high strength as well as the high modulus types, natural fibers on a cellulose basis, provided they are well pre-dried and do not hamper the polymerization process, such as flax, hemp, ramie, or also regenerated cellulose, ceramic fibers or also synthetic fibers, for example the types made of aromatic polyamide and known under the tradenames Nomex® and Kevlar®, as well as high modulus polyvinyl alcohol fibers, are suitable as filaments or fibers.

Filament rovings arranged in a special way, woven filament fabrics of the most diverse kinds, knitwear, knits and embroidered structures and in particular combinations of such arrangements which are made possible, for example, by the pultrusion process, are suitable as flat structures, for example. In this case the most diverse filament types can also be combined with each other.

For example, the interior of a fiber structure can be knitted and the edge zones can be a woven fabric or an arrangement made of rovings. In this way it is possible to subsequently shape the interior three-dimensionally in a thermal after-shaping step, while the outer area retains its shape and provides the finished article with structural strength, for example.

The option of thermal after-treatment is an advantageous specific property of the composite materials of the invention, wherein the polylaurin-lactam matrix has a wide after-shaping window which includes a temperature range of approximately 200° to 300° C.

These composite materials can be after-formed as well as transformed within the bounds of the fiber structure or geometry.

In addition to the option of thermal after-shaping, there is also the option of thermally welding structural parts together.

In this case a composite material of the type in accordance with the invention can be thermally welded together with a part containing short glass fibers and produced by injection molding, for example. It is possible in this way to fixedly connect flat composite materials, for example, of the type in accordance with the invention, with elements which permit subsequent joining by means of the known methods of the joining technology, such as heated tool welding, vibration welding, spin welding, etc.

Impregnation of the filament arrangements must take place by means of a freshly activated and still liquid lactam 12 melt.

In the process, pressure and temperature are applied in such a way that the filament structures are completely enclosed by the melt and subsequent matrix. If necessary, a closed volume area, for example similar to the finished shape of the finished product, must be formed for this, which is evacuated prior to adding the melt in order to prevent the inclusion of gas.

To produce simple, flat prepregs, the matrix can also be fed in form of a powder mixture of lactam 12 and catalyst as well as co-catalyst. In this case the powder mixture is advantageously made in an inert gas atmosphere and protected from moisture. The filament structures are impregnated with the dry powder mixture and subjected to the effects of pressure and temperature, wherein polymerization starts with the rapid passage of the lactam 12 melting point. Evacuation can be performed prior to the application of pressure and temperature to prevent the inclusion of gas.

The principles of the course of the reaction of the alkaline and the activated lactam polymerization have been often described in the literature, for example in the Kunststoff-Handbuch [Plastics Handbook], vol. VI, Polyamides; C. Hanser, publishers (1966) in the chapters "Die alkalische Lactampolymeri- sation" [Alkaline Lactam Polymerization], and "Aktivierte, alkalische Polymerisation" [Activated Alkaline Polymerization]. Catalyst systems are particularly derived from strong bases, such as sodium hydride, which eliminate the active hydrogen of the lactam and result in lactamate, such as sodium lactamate.

Co-catalysts are known in great numbers. Examples are acyl compounds, in particular those of lactam, or isocyanates, such as the caprolactam-blocked isocyanate Type IL-6 of EMS-Chemie or n- acetyl caprolactam or also aromatic carbodiimides or also mixtures of these compounds.

The formulations are advantageously matched in such a way that, following activation of the system, sufficient time for the complete penetration of the filament structures by the melt remains before the viscosity of the melt increases.

The process in accordance with the invention differs essentially from the prior art resulting in prepregs with polycaprolactam as the matrix. Since the melting point of lactam 12 (approximately 153° C.) lies close to the melting point of polylaurin-lactam (approximately 175° C.), processing in accordance with the invention takes place within a temperature range in which the liquid lactam melt transforms directly to the liquid polymer melt. This is particularly advantageous for good wetting of the filament structures and is possible because with this way of proceeding the polylaurin-lactam has a low residual monomer content of 1 to 4 weight-% in relation to the matrix, while experience has shown that it lies between 8 to 12 weight-% with polycaprolactam produced in accordance with the prior art (for example EP-A1-0 544 049).

Furthermore, the anionic polymerization of laurin-lactam shows practically no shrinkage caused by the reaction. In contrast, the shrinkage is 10 to 12 vol.-% in connection with the anionic polymerization of caprolactam. This leads to problems, for example when producing thick-walled pultruded parts, and in general results in the formation of voids, bubbles and internal stresses.

The composite materials in accordance with the invention, produced by means of impregnation of an activated lactam 12 melt and a temperature which lies above the polymer melting point at the time of polymerization, are distinguished by the following excellent properties:

* they posses a good matrix/fiber adhesion
* they have good mechanical properties and good abrasion properties;
* they are dimensionally stable
* they are clearly more stable in continuous service under the effects of heat, hydrolysis and weathering than the products based on lactam 6;

* they can be thermally after-formed or reformed and by means of the melted state they can be welded together with other components having, for example Nylon 12 or Nylon 11 as a matrix, in which case the wide processing window of polyamide 12 has advantageous effects.

The fiber-reinforced PA 12 products produced in accordance with the invention have a wide range of use.

The following applications should be mentioned as examples:

For example, pultrusion profiles are suitable as protective channels for the most varied line elements, for example as cable trays in the electrical industry or as protective elements for pipes for liquids or as parts of support elements in connection with load-bearing light construction such as roofs or in connection with bridges.

Many application possibilities for the composite materials in accordance with the invention also occur in the vehicle industry, for example as load-bearing structural frames, as cover elements or also as cover plates with so-called sandwich structures, for example with honeycomb or foamed cores. Use for such elements and structures are provided in connection with road and rail vehicles, but also in aviation and space travel.

Further applications are, for example, cage structures floating in the ocean for raising fish, dimensionally stable and load-bearing structures for antennas, parabolic antennas and transmission systems, lightweight roofing of every kind and in general applications for profiles employing the "space frame technology".

Many possibilities of use result in connection with sporting goods, for example masts for boats, frames and grips of tennis racquets, golf shafts, hockey shafts, bows and aeroshafts for shooting, and skis, sleds and surfboards for winter sports, bicycle parts, etc.

Exemplary use possibilities are furthermore machine elements which are subjected to large acceleration forces, for example in the textile industry, such as in weaving, or propulsion elements, for example propulsion screws for boats.

Carbon fiber-reinforced polylaurin-lactam components show low dynamic friction and little wear, which makes them of interest for moving machine elements in particular.

Panels of composite material on the basis of polylaurin-lactam make usable components in ship and boat construction for parts of the outer skin because of their good weathering resistance and resistance to sea water. Furthermore, suitability for covering elements in connection with the production of body parts for automobiles and covering parts for rolling stocks is also provided, wherein the respective weight reduction is essential in addition to the good sturdiness properties.

Important uses further result in connection with pipings, in particular for pipes for gases, fuels, oils and grease as well as sweet and sea water, wherein the excellent resistance of the reinforced polylaurin-lactam matrix plays a role, for example, in connection with impact stresses, termites, environmental effects, chemicals and sea water.

Such pipes can also be used as protective conduits, for example in the electrical and electronic industry, for example for electric cables.

These are only a few examples for the various uses and do not limit the invention.

The invention will now be explained in more detail by way of nine examples.

EXAMPLES

Glass fiber weave twill 92140, 390 g/m² (by Composite Shop, Jegensdorf, CH) with silane finish was used for reinforcement. Monomers used were laurin-lactam of EMS and caprolactam monomer casting quality from DSM. Sodium hydride (55% in oil) of Fluka AG, Buchs (CH) was used as catalyst. Co-catalyst S and co-catalyst A of Pacast AG, Sargans (CH) were used as activator or co-catalyst. Co-catalyst S is caprolactam blocked with isocyanate. Co-catalyst A is caprolactam blocked with carbodiimide.

Mixtures

All mixtures were prepared in an inert gas atmosphere. First the monomer was melted and mixed with the required amount of sodium hydride. The catalyst-containing solution then was cooled for comminuting the solidified material into a fine powder. The required amount of co-catalyst was then added to this powder and intensively mixed therewith.

The following mixtures were prepared:

| | Mixture (weight-%) | | | | | |
|---|---|---|---|---|---|---|
| Materials | 1 | 2 | 3 | 4 | 5 | 6 |
| Laurinlactam | 100,0 | 100,0 | 90,0 | | 10,0 | |
| Caprolactam | | | 10,0 | 100,0 | 90,0 | 100,0 |
| NaH (55% in oil) | 0,2 | 0,3 | 0,2 | 0,3 | 0,3 | 0,3 |
| Co-catalyst S | 2,5 | | 2,5 | 3,0 | 3,0 | |
| Co-catalyst A | | 4,2 | | | | 4,2 |

Production of the Test Laminates

The glass fiber weave was cut to size and pre-dried at 70° C. in a vacuum oven. Subsequently the individual glass fiber weave was sprinkled by the amount of the powder mix required for a 40% fiber volume content and stacked on each other in an inert gas atmosphere. The finished laminate was then cold-pressed and welded into a temperature-resistant film. The following conditions were selected for the subsequent pressing procedure:

Compression pressure: 5 bar

Temperature profile:
  Laurin-lactam: 150°→220° C. in 20 min. then 10 min. isothermal
  Caprolactam: 130°→230° C. in 25 min. then 10 min. isothermal It was assured by means of spacers that it was possible to achieve a relatively accurate fiber volume content of approximately 45 to 50%. A laminate thickness of 2 mm was to be achieved with six layers of glass fiber weave.

After the maximum temperature had been reached, cooling was performed in a cold press and the material subsequently taken out of the mold.

Results of Examples I to V

| | trials | | | reference trials | | |
|---|---|---|---|---|---|---|
| | I | II | III | IV | V | Ref*[1] |
| Mixture | 1 | 2 | 3 | 4 | 5 | PA12 |
| Fiber content [Vol %] | 45 | 48 | 47 | 44 | 45 | 52 |

-continued

|  | trials | | | reference trials | | |
|---|---|---|---|---|---|---|
|  | I | II | III | IV | V | Ref*1 |
| Impregnation (Tone test) | + | ++ | + | +/− | +/− | +/− |
| Extraction content MeOH [%]*3 | 2,3 | 2,4 | 2,9 | 12,2 | 10,5 | 0,9 |
| Water absorption*3 23° C., in water[%] | 1,2 | 1,3 | — | 7*2 | 6,5*2 | 1,5 |
| rel. viscosity (0,5% in m-cresol) | n.II. | n.II. | n.II. | n.II. | n.II. | 1,64 |
| DSC melting point [° C.] | 171 | 168 | 159 | 205 | 195 | 177 |
| Flexural strength, dry [N/mm²] | 580 | 650 | 550 | 500 | 460 | 430 |
| In plane tensile shear strength, dry [N/mm²] | 31 | 37 | 28 | 21 | 17 | 19 |
| In plane tensile shear strength, water-saturated (N/mm²) acc. to DIN 53495 | 28 | 35 | 26 | 13 | 9 | 19 |

*1ref: = Reference Vestopreg G101: PA 12 glass fiber weave (Atlas 1/7) with 50 vol.-% fiber content. Vestopreg is a trade name of Hüls AG (DE). The listed values were measured on parts which had been compressed at 290° C. and 80 bar.
n.II. = Insoluble; i.e. the polymer has a high viscosity.
*2= The water absorption was determined after the extraction with methanol and subsequent drying.
*3= Converted to the matrix portion.

Assessment of Samples I to V

The best composite properties resulted from the test part 11 in accordance with the invention. It was shown that in this case the effect of the co-catalyst is important, i.e. with a slow co-catalyst such as the co-catalyst A the impregnation period is extended and therefore results in improved impregnation. High values for flexural strength and tensile shear strength and shear are the result. The reference material made of a commercially available polyamide 12 composite material as well as the test parts made of anionically polymerized caprolactam showed inferior results. This is surprising mainly because comparable formulations were used in the comparison of Sample I and IV and the compression conditions actually were more favorable for the caprolactam polymerization, i.e. the initial temperature was 130° C. instead of 150° C. as with laurin-lactam.

The elements made of anionically polymerized caprolactam showed very bad results for the tensile shear strength after storage in water. It must be assumed that the residual monomer content partially interfere with or weaken the interface between fiber and matrix. This effect does not occur with parts which were anionically polymerized with laurin-lactam.

To check the results, new sample parts were produced in accordance with the same compression method but with comparable formulations.

Results of Examples VI, VII

|  | trial VI | reference trial VII |
|---|---|---|
| Mixture | 2 | 5 |
| Fiber content [vol.-%] | 43 | 45 |
| Impregnation (tone test) | ++ | +/− |
| Extraction content*2 MeOH (weight-%) [%] | 2,8 | 10,7 |
| Water absorption*2, 23° in water [%] | 1,2 | 7,8*1 |
| rel. viscosity (0,5% in m-cresol) | insoluble | insoluble |
| DSC melting point [°C.] | 167 | 204 |
| Flexural strength dry [N/mm²] | 580 | 510 |
| In plane tensile shear strength, dry [N/mm²] | 35 | 23 |
| In plane tensile shear strength, water-saturated [N/mm²]acc. to DIN 53495 | 31 | 15 |

*1= The water absorption was determined after the extraction with methanol and subsequent drying.
*2= Converted to the matrix portion.

Assessment of Samples VI+VII

The results of the first test series have been confirmed. Sample VII, produced from anionically polymerized caprolactam shows a high residual monomer content, which results in reduced adhesion at the fiber/matrix interface. Clearly reduced flexural strength and tensile shear strength are obtained as a result. Also, the subjective "glass tone" is much inferior than with anionically polymerized parts on a laurin-lactam base, in spite of a visually equal impregnation.

Furthermore, pressed parts made of carbon fiber satin weave (285 g/m²) which had first been desized were also produced. The following basic properties were determined with the same production method as described for the glass weave:

Results of Samples VIII, IX

|  | trial VIII | reference trial IX |
|---|---|---|
| Mixture | 2 | 6 |
| Fiber content [vol.-%] | 46 | 43 |
| Impregnation (tone test) | ++ | + |
| Extraction content*2 MeOH [%] | 2,2 | 11,3 |
| Water absorption*2, 23° in water [%] | 1,4 | 7,2*1 |
| rel. viscosity (0,5% in m-cresol) | insoluble | insoluble |

*1= The water absorption was determined after the extraction with methanol and subsequent drying.
*2= Converted to the matrix portion.

As with the glass fiber weave, it was also shown with the carbon fiber weave that the part (Sample VIII) polymerized with laurin-lactam showed better impregnation.

Testing Methods 3-point bending test in accordance with DIN EN63

Test speed 2 mm/min

Sample size: Length=20×thickness, width=15 mm

Thickness=2 to 3 mm

Combined in plane tensile shear strength following ASTM D-3846

Testspeed: 5 mm/min

Guide device: none

Notch: U-notches 10 mm apart

Sample size: Length=80 mm, width=15 mm

Thickness=2 to 3 mm

Determination of fiber contents by means of ash content

Extraction content: Extraction with methanol in the reflux, 8 hrs., value in relation to the matrix portion Water absorption: In accordance with DIN 53495 23° C./saturated in relation to the matrix portion Rel. viscosity : 0.5% m-cresol DSC melting point was determined in accordance with ISO 3146-C: rate of heating 20° C./min.

Impregnation/Tone test: Subjective determination by means of a metal rod. Provides qualitative information regarding fiber/resin wetting and thus impregnation.

We claim:

1. A discontinous process for producing shaped bodies of thermoplastically formable laminated composite materials of reinforcing fibers in a polyamide 12 matrix, comprising:
   a. preparing an activatd anionic lactam 12 melt;
   b. placing a reinforcing fiber arrangement in the form of woven fabrics, mats, layments, knitted fabrics, non-woven fabrics, plaited fabrics, embroidered fabrics, cross-wise arranged rovings or cobinations thereof in a mold or tool, and feeding said activated anionic lactam 12 melt in the liquid state into said mold or tool to pentrate and impregnated said fiber arrangement, wherein the reinforcing fibers are present in an amount of 25 to 60% by volume, and heating the so-impregnated fiber arrangement to a temperature of at least the melting point of polyamide 12 and at least the melting point of the activated anionic amount lactam 12 and not in excess of 300° C., whereby the lactam 12 forms a matrix for a shaped body;
   c. polymerizing said activated anionic lactam 12 melt under the effects of temperature and pressure in said mold or tool in such a way that the shape of said shaped body is achieved; and
   d. optionally reshaping said shaped body by subjecting said shaped body to an after-shaping step under the effects of pressure and temperature.

2. A process is accordance with claim 1, characterized in that the activated lactam 12 melt is produced from a catalyst-containing and from an activator-containing component lactam 12 melt by rapid intensive mixing or by melting a powder mixture of lactam 12, catalyst and activator.

3. A process in accordance with claim 2, characterized in that the catalyst and the activator in concentrations relevant to the process are introduced into the lactam 12 melt with intensive mixing, wherein the catalyst and the activator are each optionally pre-thinned, and that molten lactam 12 or other process-related additives including optionally a liquid medium which does not harm polymerization, optionally a mineral oil or a lubricating and demolding agent, are used for thinning.

4. A process is accordance with one of claim 2, characterized in that the catalyst is introduced into the activated lactam 12 melt in solid form, as a solution or a suspension, along with rapid and intensive mixing of the melt.

5. A process is accordance with claim 1, characterized in that prior to impregnation with the liquid lactam melt, the fiber arrangement is evacuated to prevent the inclusion of gas and assuring complete wetting.

6. A process in accordance with claim 1, characterized in that work in all process steps is performed under exclusion of moisture.

7. A process in accordance with claim 1, characterized in that during the preparation of the melt, during impregnation and during molding, work is performed in a protective gas atmosphere.

8. A process in accordance with claim 1, characterized in that prior to impregnation the fiber arrangement is brought to a temperature in the range of the temperature of the activated lactam 12 melt.

9. A process in accordance with claim 1, characterized in that shaping is accomplished by means of the resin transfer molding process, the roto- molding process or prepreg technology.

10. A process is accordance with claim 1, characterized in that shaped parts are thermally welded together under the effects of pressure and temperature with shaped parts containing polyamide 12 as the matrix and whose matrix has been produced in accordance with the rapid polymerization process or hydrolytically.

11. Composite fiber materials or shaped parts which can be produced in accordance with the process of claim 1.

12. Shaped body of thermoplastically formable composite materials of reinforcing fibers in a polyamide 12 matrix, wherein the polyamide consists of anionically polymerized laurin-lactam maximally containing 15 weight % of lactam co-monomers with 4 to 9 C atoms and optionally selective additives which are determined on the basis of production, processing and use, made by the process of claim 1.

13. A process according to claim 1, wherein said temperature is less than 250° C.

14. A process according to claim 7 wherein said protective gas atmosphere is dry nitrogen.

15. A process in accordance with claim 1 wherein said lactam 12 melt contains at least one additive which does not essentially harm the polymerization, said additive being selected from the group consisting of processing aids, impact modifiers and flame retardants.

16. A process according to claim 1 wherein said polyamide 12 matrix consists of anionically polymerized laurin-lactam maximally containing 15 weight % of lactam comonomers with 4 to 9 carbon atoms.

17. A discontinuous process according to claim 1 wherein the reinforcing fibers are present in an amount of 45 to 55% by volume.

18. A discontinuous process for producing shaped bodies of thermoplastically formable laminated composite materials of reinforcing fibers in a polyamide 12 matrix, comprising:
   a. providing a finely divided powder mixture of lactam 12 and amounts sufficient to effect conversion of lactam 12 to polyamide 12 of an activator and a catalyst, applying said finally divided powder to a fiber arrangement in the form of woven fabrics, mats, layments, knitted fabrics, non-woven fabrics, plaited fabrics, embroidered fabrics, cross-wise arranged rovings or combinations thereof in a mold or tool, and heating said powder mixture on said fiber arrangement under the effects of pressure and temperature to provide a lactam 12 melt on said fiber arrangement in the mold or tool;
   b. impregnating said fiber arrangement with said melt in the liquid state, and heating to a temperature of at least the melting point of polyamide 12 and not in excess of 300° C.; whereby the lactam 12 forms the matrix for a shaped body;
   c. polymerizing said activated anionic lactam 12 melt under the effects of temperature and pressure in said mold or tool in such a way that the shape of said shaped body is achieved; and
   d. optionally reshaping said shaped body by subjecting said shaped body to an after-shaping step under the effects of pressure and temperature.

19. A process is accordance with claim 18, characterized in that the temperature lies above the melting point of the matrix and below 250° C.

20. A process according to claim 18, wherein prior to impregnation of said reinforcing fibers, said fibers are evacuated to prevent the inclusion of gas and to assure complete wetting.

21. A process according to claim 18, wherein steps (a), (b), and (c) are carried out under the exclusion of moisture.

22. A process according to claim 18, wherein steps (a), (b), and (c) are carried out under a protective gas atmosphere of dry nitrogen.

23. A process according to claim 18, wherein prior to impregnation, the fibers are brought to a temperature approximately the same as the temperature of the activated lactam 12 melt.

24. A process in accordance with claim 18, wherein said shaping is carried out by resin transfer molding, rotomolding or prepreg technology.

25. A process according to claim 18 wherein said polyamide 12 matrix consists of anionically polymerized laurinlactam maximally containing 15 weight % of lactam comonomers with 4 to 9 carbon atoms.

26. A process for producing a shaped body of a thermoplastically formable composite material made of reinforcing fibers in a polyamide 12 matrix, consisting essentially of
   (a) preparing an activated anionic lactam 12 melt,
   (b) injecting the lactam 12 melt into a fiber arrangement in a mold to impregnate said fiber arrangement with said lactam 12 melt, and increasing the temperature of the melt immediately after the reinforcing fibers have been impregnated, wherein the temperature is at about the melting point of the anionically polymerized matrix and not in excess of 300° C., so that the melt forms the matrix for the shaped body,
   (c) carrying out final-polymerization of the activated lactam 12 melt under the effects of temperature and pressure in such a way that the shape is achieved, and
   (d) optionally after-shaping the shaped body under the effects of pressure and temperature.

27. A process for producing a shaped body of a thermoplastically formable composite material made of an arrangements of reinforcing fibers in a polyamide 12 matrix, consisting essentially of
   (a) applying a finely divided powder mixture of lactam 12 containing an activator and a catalyst in concentrations relevant to the process to the reinforcing fibers, and melting the powder mixture under the effects of pressure and temperature,
   (b) impregnating the melted mixture in the liquid state into the reinforcing fibers within a mold and starting polymerization, and increasing the temperature of the melt immediately after the fiber arrangement has been impregnated, wherein the temperature is increased above the melting point of the anionically polymerized matrix and not in excess of 300° C., so that the melt forms the matrix for the shaped body,
   (c) carrying out final-polymerization of the activated lactam 12 melt under the effects of temperature and pressure in such a way that the shape is achieved, and
   (d) optionally subjecting the shaped body to an after-shaping step under the effects of pressure and temperature.

* * * * *